United States Patent Office 3,452,566
Patented July 1, 1969

3,452,566
APPARATUS FOR DEEP DRAWING SOLID
PLASTIC MATERIALS
John Wesley Archer, Trenton, and Francis Joseph Fuchs,
Jr., Princeton Junction, N.J., assignors to Western Electric Company, Incorporated, New York, N.Y., a corporation of New York
Filed Sept. 12, 1967, Ser. No. 667,233
Int. Cl. B21d 22/10, 25/18; B21c 31/00
U.S. Cl. 72—60                                    6 Claims

ABSTRACT OF THE DISCLOSURE

This disclosure is directed to an improvement in apparatus for deep drawing a blank of solid plastic material, which apparatus includes opposed projections for sealingly engaging opposite surfaces of the blank to provide a fluid seal for a body of pressurized fluid surrounding the outer peripheral portion of the blank, and which improvement includes a fluid chamber, located below the bottom projection, for receiving a portion of the aforementioned pressurized fluid and which fluid exerts a force (proportional to the pressure level of the pressurized fluid) on the bottom projection to maintain the projections in sealing engagement with the blank.

CROSS-REFERENCE TO RELATED APPLICATION

This invention is an improvement over the structure disclosed in the co-pending application of F. J. Fuchs, Jr. for Apparatus for Deep Drawing Solid Plastic Materials Ser. No. 578,279, filed Sept. 9, 1966, and assigned to the same assignee as this application.

BACKGROUND OF THE INVENTION

Known apparatus for deep drawing blanks of solid plastic materials under high hydrostatic pressure have been exceedingly massive, particularly when considered in the light of the size of the articles produced. The necessity for such large, bulky apparatus results from the magnitudes of the pressures being utilized. For example, in order to deep draw a steel blank 4 inches in diameter, pressures in excess of 150,000 p.s.i. are required. Prior to the invention of Mr. F. J. Fuchs, Jr., noted above, a 1,000 ton press weighing approximately 38,000 pounds and standing approximately 12 feet high, generally was necessary to accomplish such a draw. Obviously, the degree of size and bulk precluded the installation of a press with the necessary capacity in many industrial complexes where it would otherwise be highly desirable to be able to deep draw metals.

With reference to the expression "solid plastic material," it is known by those skilled in the art, that many metals and other materials increase in ductility, or have an increased capacity for deformation without fracture, when they are subjected to high hydrostatic pressure. These metals and other materials are known as "solid plastic materials." This principle is treated in P. W. Bridgman, "Large Plastic Flow and Fracture," published by McGraw-Hill Book Company of New York in 1952. Accordingly, it will be understood that the expression "solid plastic material" as used in this specification and claims, is used in this context.

The object of the invention of the above-noted copending application, therefore, is to provide an apparatus utilizing high hydrostatic pressure for deep drawing solid plastic materials, which apparatus is of relatively reduced size and weight, supports the impressed hydrostatic loads independently of the drawing ram, and which locks a high pressure chamber against fluid leakage therefrom.

This object is generally achieved quite satisfactorily by the apparatus disclosed in the co-pending application. However, it has been found that the apparatus of the present invention provides improved results, in particular, the apparatus of the present invention permits the apparatus disclosed in the co-pending application to operate at even higher pressures, and also provides improved results at the lower pressures.

More specifically the pressure vessel 10 disclosed in the co-pending application of Mr. F. J. Fuchs, Jr., includes a pair of opposed upper and lower annular projections 22 and 46, respectively, positioned relatively so as to "bite" or "dig into" the upper and lower surfaces of a blank of solid plastic material 86, to seal off the central portion of the blank from the outer peripheral portion. The annular projections provide an extrusion die through which the outer peripheral portion of the blank is inwardly extruded; and further provide a mechanical seal for "sealingly engaging" the blank to complete the annular high pressure chamber 84 and prevent inward escape of pressurized fluid contained in the annular chamber.

It has been found, however, that upon occasion as the fluid in the annular chamber 84 has been increased to extremely high pressures, the resulting forces acting against the top plug 40 can become sufficiently great so as to deflect or move the upper plug, and therewith the upper projection 46, and thereby increase the gap between the projections so as to adversely effect their "sealing engagement" with the blank 86 and thus adversely effect the deep drawing process.

SUMMARY OF THE INVENTION

It is the object of this improvement invention, therefore, to provide in an apparatus for deep drawing a blank of solid plastic material, and which apparatus includes opposed projections for sealingly engaging opposite surfaces of the blank to provide a fluid seal for a body of pressurized fluid surrounding the outer peripheral portion of the blank, the improvement including means, responsive to said body of pressurized fluid, for maintaining said projections in the sealing engagement with the blank during the drawing thereof.

It will be understood by those skilled in the art, that although the present improvement invention is particularly useful in the extremely high operating pressures and in the deep drawing of the more brittle materials, the present invention is equally useful in deep drawing at the lower operating pressures and in the deep drawing of the less brittle and more ductile solid plastic materials. Further, it will be understood that the foregoing teaching of the technological conditions giving rise to the present invention, is merely illustrative and not limiting, and that there is no intent to impart to the appended claims any limitation to the extremely high operating pressure range or to utility with only the more brittle materials.

BRIEF DESCRIPTION OF THE DRAWINGS

The exact nature of this invention as well as many of the attendant advantages, will be readily appreciated from a consideration of the following detailed description of the invention and the annexed drawing wherein.

DETAILED DESCRIPTION

Figure 1:
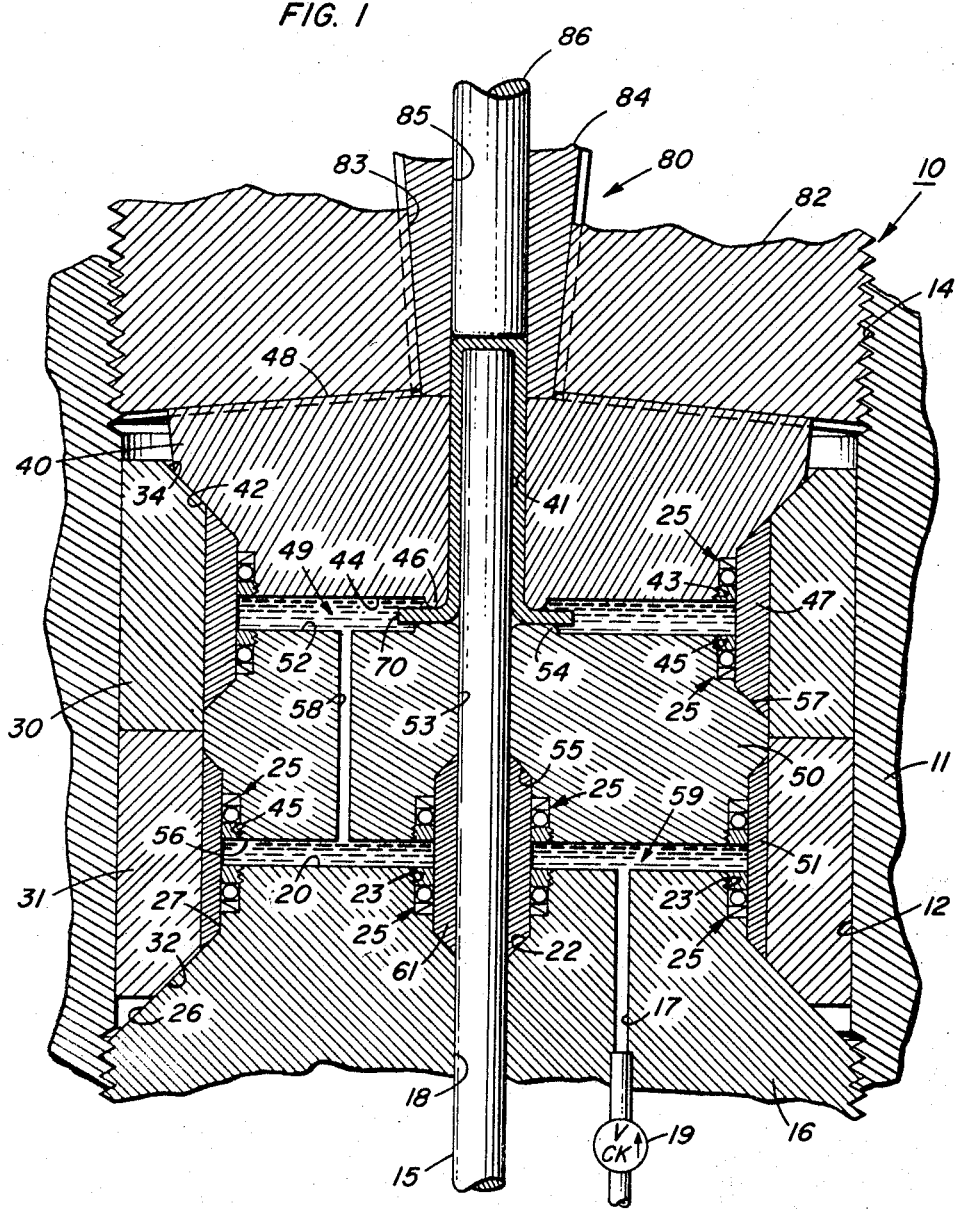
FIG. 1 is a front elevational, cross-sectional view of an embodiment of an apparatus constructed in accordance with the teaching of the present invention.

Referring now to FIG. 1, there is shown apparatus for deep drawing solid plastic materials, embodying the present invention, and designated generally by the reference numeral 10.

More specifically, the apparatus 10 includes a pressure vessel 11 having a cylindrical bore 12 which forms, generally, a cylindrically shaped pressure chamber. The lower portion of the bore 12 is threaded as shown, and the upper portion of the bore is provided with a plurality of rows of teeth 14.

A lower plug 16 is threadedly secured in the lower portion of the bore 12, and is provided with a centrally disposed bore 18 extending therethrough. A counterbore 22, coaxial with centrally disposed bore 18, extends into lower plug 16 from the upper surface 20 thereof. Counterbore 22 includes an inclined surface and a longitudinally extending surface for complementarily receiving a trapezoidally shaped retaining ring 62, in a manner to be discussed infra in greater detail. A threaded, annular recessed channel 23 is provided at the upper corner of counterbore 22 for receiving therein a high pressure seal assembly indicated generally by reference numeral 25. This seal assembly may be any of several suitable seal assemblies known in the art, the one shown including an anti-extrusion ring, an O-ring type seal, and a threaded retaining ring for coopearting with threaded channel 23 to secure the seal assembly 25 therein. The periphery of the upper portion of plug 16 is provided with an inclined or beveled surface 26 extending from the threaded outer surface to a longitudinally extending shoulder 27. The upper corner of shoulder 27 is provided with an annular channel 23 for receiving a high pressure seal 25 in substantially the same manner as discussed with respect to counterbore 22.

A pair of annular retaining rings, an upper ring 30 and a lower ring 31, dimensioned for close accommodation within bore 12, are provided immediately above bottom plug 16. The retaining rings 30, 31 are generally rectangular in cross-section, the upper inner portion of upper ring 30 having a beveled surface 34 and the lower inner portion of lower ring 31 having an inclined or beveled surface 32. The lower surface of upper ring 30 and the upper surface of lower ring 31, when the apparatus is assembled, are in surface-to-surface contact. Beveled surface 32 of lower ring 31 complementarily engages the beveled surface 26 of lower plug 16, and the beveled surface 34 of upper ring 30 complementarily engages a beveled surface 42 of upper die plate 40.

Referring again to FIG. 1, the die section of apparatus 10 generally comprises an upper die plate 40 and a lower die plate 50. Upper die plate 40 is a generally circular member having a centrally formed bore 41, and an inclined or beveled surface 42 on its outer lower periphery which is adapted for complementary engagement with the beveled surface 34 of the annular retaining ring 30. The lower periphery of upper die plate 40 is provided with a threaded annular channel 43 for receiving a high pressure seal 25 in exactly the manner discussed with respect to channels 23 and seals 25 of plug 16. The lower surface 44 of upper die plate 40 is generally flat and is provided with an annular, downwardly extending projection 46 immediately adjacent the centrally formed bore 41. The upper surface 48 of the upper die plate 40 is a substantially flat surface, however, being slightly inclined with respect to the horizontal so that surafce 48 presents a generally conically shaped configuration with respect to the die plate locking device, as will be discussed hereinafter in greater detail.

Lower die plate 50 is a generally circular member having a centrally disposed bore 51 extending therethrough. The upper surface 52 of lower die plate 50 is generally flat and is provided with an annular, upwardly extending projection 54 immediately adjacent centrally disposed bore 51. A counterbore 55, having a high pressure seal 25 mounted therein, is provided in the bottom surface 56 of lower die plate 50 and is the mirror image of counterbore 22 of lower plug 16.

The peripheral surface of lower die plate 50 is provided with a centrally disposed shoulder 57, having a generally trapezoidal cross-section, and which shoulder is complementarily received between retaining rings 47 and 51. Threaded channels 45 are provided in the upper and lower peripheral corners of lower die plate 50 for receiving high pressure seals such as seals 25, referred to above with respect to lower plug 16.

The lower surface 44 of upper die plate 40 cooperates with the upper surface 52 of lower die plate 50 to define the upper and lower surfaces, respectively, of a first fluid chamber indicated generally by reference numeral 49 for containing working fluid under high hydrostatic pressure, to pressurize a blank to be drawn. Annular projections 46 and 54 cooperate to define an annular extrusion die having a die gap therebetween which is slightly less than the thickness of the blank 70 to be drawn. The cooperartion of projections 46 and 54 with the blank causes a fluid sealing engagement with the blank 70 to be deep drawn, and the projections and blanks, and thus define the radially inward wall of working chamber 49. The radially outer portion of chamber 49 is closed against fluid loss by the aforementioned high pressure seals 25 in each of the upper and lower die plates, which seals cooperate with the retaining ring 47, the outer peripheral surface of which is snugly received by the inner surface of retaining ring 30.

The lower surface 56 of lower die plate 50 cooperates with the upper surface 20 of lower plug 16 to define the upper and lower surfaces, respectively, of a second fluid chamber indicated generally by reference numeral 59 for containing pressurized support fluid for compensating for tendencies to die gap variation. The outer and inner ends of second chamber 59 are closed against fluid escape by the aforementioned opposed high pressure seal assemblies 25. These seals are maintained by retaining rings 61 and 62, ring 61 being received in counterbores 22 and 55, at the inner and outer chamber extremities, respectively, and the outer peripheral surface of retainer ring 62 being snugly received by the inner surface of lower retaining ring 31. The inner surface of retainer ring 62 is equal to the diameter of bores 18 and 51 formed in the bottom plug 16 and lower die plate 50 respectively, and cooperates therewith to define a passage for the receipt of drawing ram 15 therethrough.

Figure 2:
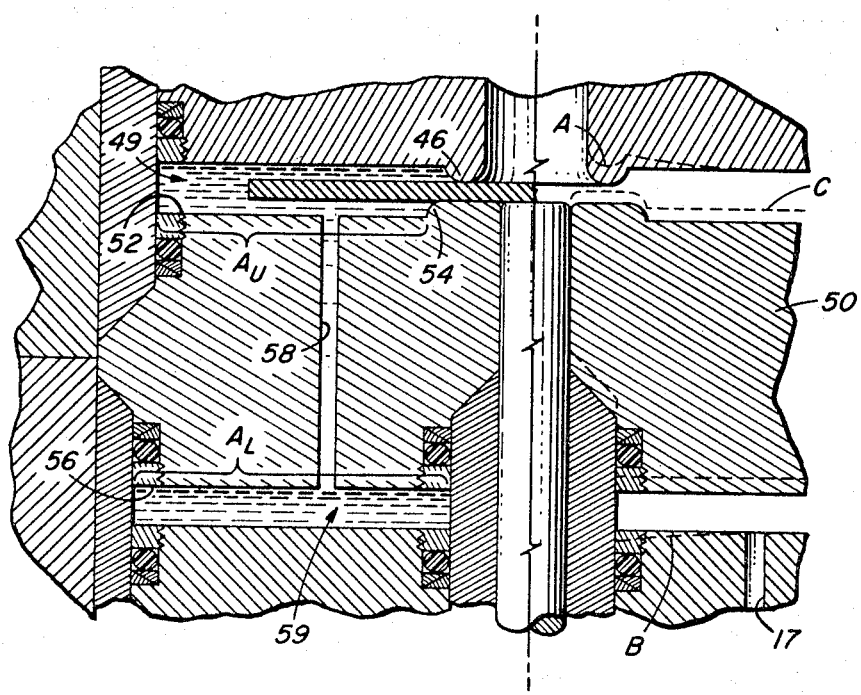
FIG. 2 is an enlarged partial view of the lower die plate, upper die plate and bottom plug illustrating diagramatically the manner in which the shown structure embodies the present invention.

As may be seen in both FIGS. 1 and 2, working fluid chamber 49 and support fluid chamber 59 are in communication through radially disposed, vertically extending passages 58 formed in the lower die plate 50. Further, fluid pressure is provided to chambers 49, 59 through a passage 17 which extends from a source of high pressure fluid (not shown) to the support fluid chamber 59. A suitable check valve 19 (FIG. 1) is provided in passage 17 to allow the passage of fluid therethrough only in the direction of chamber 59.

As was discussed in great detail in Mr. F. J. Fuchs, Jr.'s co-pending application, the upper die plate 40 is maintained in proper operating position by a locking assemblage designated generally by reference numeral 80. Briefly, it may be stated that the locking assemblage 80 comprises a plurality of slidably inter-engaged segments 82 which cooperate to define a downwardly convergent tapered opening 83, through which is received a tapered ram 84. Insertion of ram 84 into tapered opening 83 forces segments 82 radially outwardly causing them to be securely locked by inter-engagement with teeth 14 of vessel 11.

Tapered ram 84 has a centrally disposed bore 85 therein for receiving a back-up ram 86 reciprocably therethrough. The function of these various rams will be discussed hereinafter with respect to the description of the operation of the drawing apparatus.

Referring now to FIG. 2 it will be specifically noted that the annular area of the upper surface 52 of the lower die plate 50, indicated at $A_u$, is smaller than the annular lower surface of the die plate 50, indicated at $A_L$. Thus it will be understood, that when the upper and lower fluid chambers 49 and 59, respectively, are filled with a common pressurized fluid (common pressurized fluid in that as described above the chambers are placed in fluid communication by passages 58) the upward force exerted by the pressurized fluid on the larger lower surface 56, will be greater than the downward force exerted on the smaller upper surface 52. Thus, it will be further understood, that the net or resultant upward force will urge or force the lower projection 54 upwardly toward the upper projection 46, thus maintaining the projections in biting or sealing engagement with the blank 70. It will be still further understood that the resultant upwardly acting force will be proportional to the increases in the fluid pressure in the chambers, hence, the greater the tendency of the force acting on upper surface 52 to move the projections 46 and 54 out of sealing or biting engagement with the blank 70, the greater the resultant force generated acting on the lower surface 52 for overcoming such tendency and for maintaining the projections in engagement with the blank.

Further, it will be understood that the amount of difference in the annular areas indicated at $A_u$ and $A_L$, will depend, primarily, on the degree or amount of biting or sealing engagement desired or required between the annular projections and the blank.

OPERATION

With the locking assemblage 80 and top die plate 40 removed from vessel 11, a blank 70 of solid plastic material is positioned upon projections 54 directly over bore 51, and a suitable fluid is provided in the vessel so as to completely fill chamber 59 and passages 58, and to cover the blank in its position on shoulder 54. The apparatus is thereafter reassembled and ram 84 is moved downwardly, as shown in FIG. 1, to secure the locking assembly and related elements in place. The degree of advancement of ram 84 is such as to cause the projections 46 and 54 to "bite" or "dig into" the blank 70 so as to establish a fluid tight sealing engagement along the lines of engagement with the blank 70.

Fluid under high pressure from the high pressure source (not shown), is communicated to chambers 49 and 59, through passages 58, passage 17, and check valve 19. The fluid in pressure chamber 49 surrounds the outer peripheral portion of the blank, and subjects the peripheral portion to high hydrostatic pressure sufficiently great to cause the blank 86 to increase in ductility sufficiently to permit the blank to be deformed, e.g. extruded between die projections 46, 54 and deep drawn into the draw die provided by bore 41, without fracture. Where the material is particularly brittle and, under ordinary pressure conditions, is of relatively low ductility, the pressures necessary to accomplish the ductility required for deep drawing can be extremely high. It is under these conditions that unacceptable upward deflection or movement of the upper die plate has occasionally caused a separation in the die plate projections thereby increasing the die gap therebetween and causing the loss of the sealing or "biting" engagement, with the blank, notwithstanding the backing force provided by locking assemblage 80. As was noted above, loss of the sealing or "biting" engagement between the die plate projections and the blank results in the loss of fluid pressure in the working chamber, and therewith the capability for increased ductility; and hence, adversely affects the deep drawing. The present invention, as taught above, maintains the die gap substantially constant, and the projections 46, 54 in sealing or "biting" engagement with blank 70.

Referring to FIG. 2, therefore, there is shown, in enlarged partial cross-section, the relative positions of die plates 40, 50, and bottom plug 16 before and after the introduction of highly pressurized fluid into the working fluid chamber 49. The initial relative positions of the elements are shown in solid lines, and the relative positions of the elements after the introduction of pressure are shown in broken lines.

Prior to the afore-mentioned introduction of pressurized fluid, upper die plate 40, lower die plate 50, and bottom plug 16 are positioned as shown by the solid lines of FIG. 3. The presence of sufficiently high pressurized fluid in chambers 40 and 59 causes the upward deflection or movement of upper die plate 40 to the position shown in broken line and designated as A, and the downward deflection or movement of lower plug 16 to the position shown in broken line and designated as B.

As set forth in detail above, the area of upper surface 52 of lower die plate 50 exposed to the fluid in chamber 49 is smaller than the area of the lower surface of lower die plate 50 exposed to the fluid in chamber 59, and thus, since the fluids in chambers 49 and 59 are in communication and therefore at the same pressure, the fluid pressure generated force acting upwardly against surface 56 is greater in magnitude than the fluid pressure generated force acting downwardly against surface 52. The resultant upwardly acting force, therefore, tends to displace lower die plate 50 upwardly, and when such upward displacement is permitted by the deflection or upward movement of upper die plate 40, actual displacement or movement does occur and the lower die plate 50 assumes the position shown in broken lines and designated as C in FIG. 3. Thus it can be said that any deflection or upward movement of upper die plate 40 will be compensated by a corresponding displacement of lower die plate 50, such that, the "biting" or sealing engagement of projections 46 and 54 is maintained so as to preclude loss of fluid pressure in chamber 49 around the blank, and so as to maintain the blank in high hydrostatic pressure and, hence, relatively high ductile.

For emphasis, is will be recalled, that since pressurized fluid in support chamber 59 is in fluid communication with the pressurized fluid in working chamber 49, and hence at the same pressure, the greater the tendency toward projection separation due to the fluid pressure in the working chamber, the greater the magnitude of the above-mentioned resultant force tending to displace the lower die plate 50 upwardly and maintain the projections in "biting" or sealing engagement with the blank 70. Thus, the resultant force generated by the support fluid is proportional to the forces generated by the working fluid tending to cause projection separation.

It is to be noted that projection 54 is provided with a substantially flat upper surface whereas projection 46 is substantially completed arcuate. These configurations provide for a positive reactive surface, i.e. the flat surface of projection 54, with which projection 46 can cooperate to mechanically engage blank 70, notwithstanding relative movement between projections 46 and 54 because of the deflection or upward movement of upper die plate 40.

Once high hydrostatic pressure, of sufficient magnitude to appropriately increase the ductility of the blank 70 has been achieved in the system, rams 15 and 86 can be suitably advanced to draw the blank through the draw die provided by bore 41, and deform the blank as desired.

Thus, it can be seen that this apparatus for the deep drawing of solid plastic material under high hydrostatic pressure is not prejudicially affected by deflection or movement of the structural elements because of the forces generated by the working fluid pressure, and the sealing engagement between the projections and the blank is maintained at all times.

It will be further understood by those skilled in the art that the expression "deep drawing," or "deep draw," is a term of art connoting a general class of methods for forming metals and other materials, into cupped, shell-like, or tubular configurations, and that the use of the methods of the present invention are equally applicable and advantageous to perform what to some could be considered to be a "shallow draw." Further, it would be understood, that the expression "deep drawing" or "deep draw," is used in a qualitative sense, that for example, the drawing of a blank of titanium to a depth of one-fourth (¼) inch, would, due to the brittleness of titanium, be a "deep draw."

Obviously, many modifications and variations of the present invention are possible in the light of the above teachings. It is therefore to be understood, that within the scope of the appended claims the invention may be practiced otherwise than as specifically described therein.

What is claimed is:

1. In an apparatus for deep drawing a blank of solid plastic material, and which apparatus includes opposed projections for sealingly engaging opposite surfaces of said blank to provide a fluid seal for a body of pressurized fluid surrounding the outer peripheral portion of the blank, the improvement comprising:

means, responsive to said body of pressurized fluid, for maintaining said projections in said sealing engagement with said blank during the drawing thereof.

2. The improvement as claimed in claim 1 wherein said recited means includes a body of fluid, in fluid communication with said body of pressurized fluid, and for generating a force for maintaining said projections in sealing engagement with said blank.

3. In an apparatus for drawing a blank of material, which apparatus includes opposed projections for sealingly engaging opposite surfaces of said blank and for defining one wall of a first fluid tight chamber for receiving pressurized fluid, the improvement comprising:

means for defining a second fluid tight chamber for receiving said pressurized fluid, which pressurized fluid is for generating a force for maintaining said projections in sealing engagement with said blank; and means for communicating said first fluid tight chamber with said second fluid tight chamber whereby changes in the pressurization level of said pressurized fluid change the magnitude of said generated force accordingly.

4. In an apparatus for deep drawing a blank of solid plastic material, which apparatus includes opposed annular projections for being forced into biting engagement with opposite surfaces of said blank to provide a fluid seal between the central portion of said blank and the outer peripheral portion thereof, and a chamber for surrounding said outer peripheral blank portion with a body of pressurized fluid for subjecting said outer peripheral blank portion to high hydrostatic pressure sufficiently great to cause said outer peripheral blank portion to increase in ductility, and which body of pressurized fluid upon being sufficiently increasingly pressurized tends to force said projections apart and out of said biting engagement, the improvement comprising:

means, responsive to said body of pressurized fluid, for providing an increasing force, directly proportional to increases in said fluid pressure, to one of said annular projections to maintain said one annular projection in said predetermined relationship with said other annular projection and thereby to maintain said annular projections in said biting engagement with opposite surfaces of said blank.

5. Apparatus for deep drawing a blank of solid plastic material, comprising:

means defining a working fluid chamber and a support fluid chamber in vertical relationship, and including:

a die plate providing a common wall for both chambers and having opposed pressure receiving surfaces presenting different sized areas, the larger area surface being within the support fluid chamber and the smaller area surface being within the working fluid chamber, and said member having a passage formed therein for communicating said chambers;

a pair of opposed closed annular projections within said working chamber for engaging opposite surfaces of a blank to seal off the central portion of said blank from the outer portion thereof;

said die plate being connected to one of said annular projections so that upon said chambers being pressurized, said die plate moving said one annular projection toward the other annular projection, to maintain said annular projections in said biting engagement with the blank.

6. An apparatus for deep drawing solid plastic material under high hydrostatic pressure comprising:

a pressure vessel;

an upper die plate mounted in said pressure vessel, said upper die plate having an annular projection extending downwardly therefrom;

a lower die plate mounted in said pressure vessel and having an annular projection extending upwardly therefrom;

said upwardly and downwardly extending projections for bitingly engaging opposite surfaces of said blank and for sealing off the central portion of said blank from the outer peripheral portion thereof;

said upper die plate, lower die plate and said upwardly and downwardly extending annular projections, cooperating to define at least three walls of a first chamber for receiving the outer peripheral portion of said blank and for containing pressurized fluid for exerting high hydrostatic pressure on said peripheral blank portion, sufficiently great to cause said blank to increase in ductility;

means disposed within said pressure vessel for cooperating with said lower die section to define a second chamber for containing pressurized fluid;

said lower die plate having a passage formed therein for placing said chambers in fluid communication;

the lower surface of said lower die plate being greater than the upper surface thereof;

said pressurized fluid in said first chamber, upon being sufficiently pressurized, generating forces tending to move said annular projections out of said biting engagement with said blank;

said pressurized fluid in said second chamber; upon being sufficiently pressurized, and due to said differential in lower die plate surfaces, generating a force for overcoming the aforesaid tendency of the aforesaid forces, and for forcing said lower annular projection toward said upper annular projection to maintain said projections in said biting engagement with said blank; and means extending through said vessel and die plates and for engaging said central portion of said blank and for deep drawing said blank.

References Cited

UNITED STATES PATENTS

| | | | |
|---|---|---|---|
| 2,821,156 | 1/1958 | Lyon | 72—347 |
| 2,847,957 | 8/1958 | Watter et al. | 72—60 |
| 3,172,928 | 3/1965 | Johnson | 72—56 |

RICHARD J. HERBST, *Primary Examiner.*

U.S. Cl. X.R.

72—271, 347